(12) United States Patent
Zauner

(10) Patent No.: US 7,384,609 B2
(45) Date of Patent: Jun. 10, 2008

(54) PRE-CONVERTER DEVICE FOR CLEANING EXHAUST GAS FOR AN INTERNAL COMBUSTION ENGINE

(75) Inventor: Gunter Zauner, Peuerbach (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 588 days.

(21) Appl. No.: 10/766,469

(22) Filed: Jan. 29, 2004

(65) Prior Publication Data
US 2004/0187485 A1    Sep. 30, 2004

Related U.S. Application Data

(60) Provisional application No. 60/443,186, filed on Jan. 29, 2003.

(51) Int. Cl.
*F02K 1/00* (2006.01)
*F01N 1/00* (2006.01)
*F01N 3/08* (2006.01)
*B01D 50/00* (2006.01)

(52) U.S. Cl. .............. 422/168; 422/176; 422/177; 422/180; 181/213; 181/255

(58) Field of Classification Search ........... 422/177, 422/180, 176; 181/213, 255
See application file for complete search history.

(56) References Cited

U.S. PATENT DOCUMENTS

| | | | |
|---|---|---|---|
| 4,632,216 A * | 12/1986 | Wagner et al. | 181/255 |
| 5,012,642 A | 5/1991 | Laimbock | |
| 5,014,510 A | 5/1991 | Laimbock | |
| 5,110,560 A * | 5/1992 | Presz et al. | 422/176 |
| 5,828,013 A * | 10/1998 | Wagner et al. | 181/255 |
| 5,934,073 A * | 8/1999 | Gieshoff et al. | 60/320 |
| 6,604,604 B1 * | 8/2003 | Badeau et al. | 181/258 |
| 6,689,327 B1 * | 2/2004 | Reck et al. | 422/180 |
| 6,877,960 B1 * | 4/2005 | Presz et al. | 417/198 |

FOREIGN PATENT DOCUMENTS

| | | |
|---|---|---|
| DE | 100 02 024 C 1 | 6/2001 |
| EP | 0 411 561 A1 | 2/1991 |
| GB | 2 220 150 A | 1/1990 |
| JP | 05-86843 | 4/1993 |
| JP | 8-326528 | 12/1996 |
| JP | 10-325315 | 12/1998 |

* cited by examiner

*Primary Examiner*—Alexa D. Neckel
*Assistant Examiner*—Matthew J Merkling
(74) *Attorney, Agent, or Firm*—Osler, Hoskin & Harcourt LLP

(57) ABSTRACT

A catalytic converter device for cleansing exhaust gas emitted from an internal combustion engine is disclosed. The catalytic converter device includes an elongated body having a longitudinal axis. An inlet area is located at one end of the elongated body, wherein the exhaust gas enters the elongated body in the inlet area. A sleeve extends from the inlet area. The sleeve has a catalytic material formed thereon. The sleeve has an active surface for reacting with the exhaust gas, wherein the size of the active surface increases as a distance from the inlet area increases. The sleeve includes a plurality of openings formed therein and at least one depression.

15 Claims, 4 Drawing Sheets

PRE-CONVERTER DEVICE FOR CLEANING EXHAUST GAS FOR AN INTERNAL COMBUSTION ENGINE

CROSS REFERENCE TO RELATED APPLICATION

This application relates to and claims priority to U.S. Provisional Patent Application No. 60/443,186, filed on Jan. 29, 2003, the contents of which are incorporated herein by reference.

BACKGROUND OF THE INVENTION

1. Field of the Invention

The present invention relates to a preliminary catalytic converter ("pre-converter") device for cleaning exhaust gas, that contains hydrocarbons, which are emitted from an internal combustion engine. In particular, the pre-converter device has a perforated sleeve that is coated with a catalytic material to form an active surface. The area of the active surface increases as the distances from the pre-converter inlet increases. The pre-converter device is configured such that the active surface area on the pre-converter device increases as the temperature of the exhaust gases within the pre-converter device increases and the gas expands.

2. Description of Related Art

The typical operation of internal combustion engines creates exhaust gases. The pollutant content of these exhaust gases must meet certain legally prescribed requirements. The content is usually determined during a cycle of operations including a cold start and idling operations. A catalytic converter is often used to cleanse the exhaust gas. These requirements cannot be met unless the catalytic converter can become quickly operational (i.e., rapidly heated). Typically, a catalytic converter is arranged in the exhaust manifold directly following the cylinder. This arrangement is helpful during cold starting because the catalytic converter is rapidly heated. This location of the converter, however, impairs the functional performance of the exhaust system because of the amount of space occupied by the converter. The reduction in performance of the exhaust system has a direct impact on engine performance including a deterioration of the power, a reduction in the torque delivered, and an increase in fuel consumption. Furthermore, the close proximity of the converter to the engine cylinders can cause undesired reactions on the cylinder.

German Patent No. DE 10002024 C1 discloses catalytic device that is positioned between a first and a second section of the reactor. The catalytic device includes a boundary wall containing a catalytic material in the form of a foam or woven material that separates the two sections. Gases are directed from the first section into the second section through catalytic device. DE 100002024 discloses various configurations of the catalytic device including a conical tapered shape device having an enlarged end adjacent the first section and a reduced end adjacent the second section, a cylindrical shaped device having a plurality of channels extending along the axis of the device, and a cylindrical shaped device having a wavy exterior having portions with reduced diameter. These devices have been found to be inefficient and inadequate in treating the gas. In particular, these devices do not account for the expansion of the exhaust gas as it is heated while passing through the catalyst.

Others have tried to provide converters that become quickly operational during a cold start while not being placed in close proximity to the exhaust port. U.S. Pat. No. 5,012,642 to Laimböck discloses a converter having diffuser pipe connected thereto, which extends within the diffuser to a position adjacent the exhaust port. UK Patent Application No. 2,220,150 discloses tapering an upstream end of the converter to produce more rapid heating during cold starting.

Japanese Patent Nos. 5-86843 and 10-325315 disclose that it is known to provide a main catalytic converter, which is preceded by a preliminary catalytic converter. The provision of the pre-converter permits the main converter to be located a greater distance from the exhaust port. As such, the impact on engine performance is reduced. The pre-converter is used to clean exhaust gas and increase the temperature of the exhaust gases. The pre-converter ensures that the exhaust gas is at a proper temperature to activate the main converter and of a proper composition. Use of a pre-converter reduces the quantity of unburned hydrocarbons normally found in the exhaust gases emitted by an internal combustion engine. It is desirable to locate the pre-converter is disposed as close as possible to the cylinder of the internal combustion engine so that the high temperatures occurring adjacent to the cylinder will cause the pre-converter to be become quickly operational. Locating the pre-converter in too close a proximity to the cylinder will produce the above-described reduction in engine performance.

U.S. Pat. No. 5,014,510 to Laimböck discloses a pre-converter positioned in an exhaust system adjacent the exhaust port of the engine. The location of this pre-converter suffers from many of the above-described drawbacks including an adverse impact on engine performance. Furthermore, the pre-converter extends across the entire cross-section of the exhaust system, which adversely impacts the flow dynamics of the exhaust gases within the exhaust system and performance.

European Patent Application No. 411,561 discloses a pre-converter positioned in close proximity to the exhaust port of the engine. The location of this pre-converter adversely impacts engine performance. The pre-converter is positioned around the inner circumference of the exhaust system. As such, all of the exhaust gases from the cylinder do not flow through the pre-converter.

SUMMARY OF THE INVENTION

For this reason, it is an aspect of the present invention to correct the shortcomings and poor performance of the converter and pre-converters described above. It is a further aspect of the present invention to provide a pre-converter for use in an exhaust system of an internal combustion engine that overcomes the shortcomings and deficiencies described above.

In accordance with one aspect of embodiments of the present invention, a catalytic converter device for cleansing exhaust gas emitted from an internal combustion engine is disclosed. While the catalytic converter device is preferably a pre-converter, the catalytic device can be a primary or main catalytic converter device as well. The converter device includes an elongated body having a longitudinal axis. An inlet area is located at one end of the elongated body. The exhaust gas from the internal combustion engine enters the elongated body in the inlet area. A sleeve extends from the inlet area. The sleeve has a catalytic material formed thereon. The sleeve has an active surface for reacting with the exhaust gas. The size of the active surface increases as a distance from the inlet area increases, whereby provides a greater surface for reaction with the exhaust gas to improve the conversion of the unburned hydrocarbons and pollutants.

The sleeve has a plurality of openings formed therein to permit the exhaust gas to flow there through. The plurality of openings extend across the active surface. The sleeve can include at least one depression formed therein, which increases the amount of active surface area within the pre-converter for reacting with the unburned hydrocarbons and pollutants. The depression(s) can extend substantially parallel to the longitudinal axis of the body. The sleeve without a depression has a first internal cross section. The sleeve having the at least one depression has a second internal cross section. The second internal cross section is smaller than said first internal cross section. The second internal cross section changes as the distance from the inlet area increases. Each depression has a depth. In accordance with embodiments of the present invention, the depth of the depression can increase as the distance from the inlet area increases.

In accordance with another aspect of the preferred embodiments of the present invention, an exhaust system for an internal combustion engine is disclosed. The exhaust system includes a flow path for exhaust gas emitted from the internal combustion engine. A primary catalytic converter device for cleansing the exhaust gas is arranged in the flow path. A preliminary catalytic converter device for cleansing the exhaust gas is also arranged in the flow path. The preliminary catalytic converter is upstream from the primary catalytic converter such that the exhaust gas emitted from the internal combustion engine travels through the preliminary catalytic converter device before traveling to the primary catalytic converter device.

The preliminary converter device can include an elongated body having a longitudinal axis. An inlet area is located at one end of the elongated body. The exhaust gas from the internal combustion engine enters the elongated body in the inlet area. A sleeve extends from the inlet area. The sleeve has a catalytic material formed thereon. The sleeve has an active surface for reacting with the exhaust gas. The size of the active surface increases as a distance from the inlet area increases, whereby provides a greater surface for reaction with the exhaust gas to improve the conversion of the unburned hydrocarbons and pollutants.

The exhaust system can further include a muffler. At least a portion of the preliminary converter device is arranged at least partially within the muffler.

According to a further aspect of one or more embodiments of this invention, an internal cross-sectional area of the sleeve in at least one plane that is perpendicular to the longitudinal axis is at least about 5% smaller than an area of a circle having a perimeter equal to a perimeter of the active surface at the at least one plane.

At an end of the sleeve opposite the inlet area, the circle may have a diameter that is larger than a width of the sleeve. The perimeter of the active surface may be non-circular at a longitudinal position where the perimeter increases as the sleeve extends away from the inlet area.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
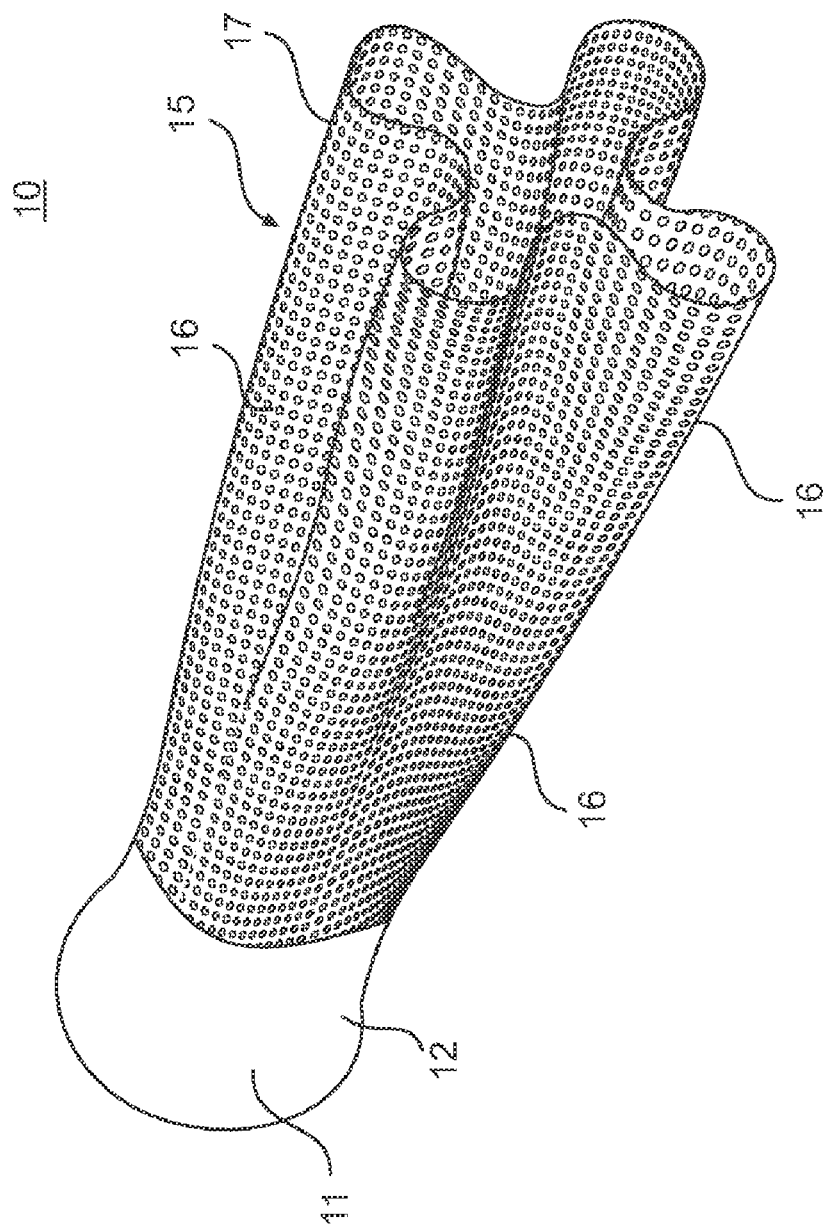
FIG. 1 is a right side schematic view of a pre-converter according to an embodiment of the present invention.

A pre-converter 10 according to an embodiment of the present invention is illustrated in FIG. 1. The pre-converter 10 is adapted to be incorporated into an exhaust system 20 for an internal combustion engine. The internal combustion engine can be either a two-stroke engine or a four-stroke engine. The engine can have one or more cylinders. It is contemplated that the internal combustion engine containing the pre-converter 10 can be used to supply power to a snowmobile, a personal watercraft, a motorcycle, a three-wheeled vehicle, a go-kart, an all-terrain vehicle, or an outboard engine for use on a boat.

Figure 2:
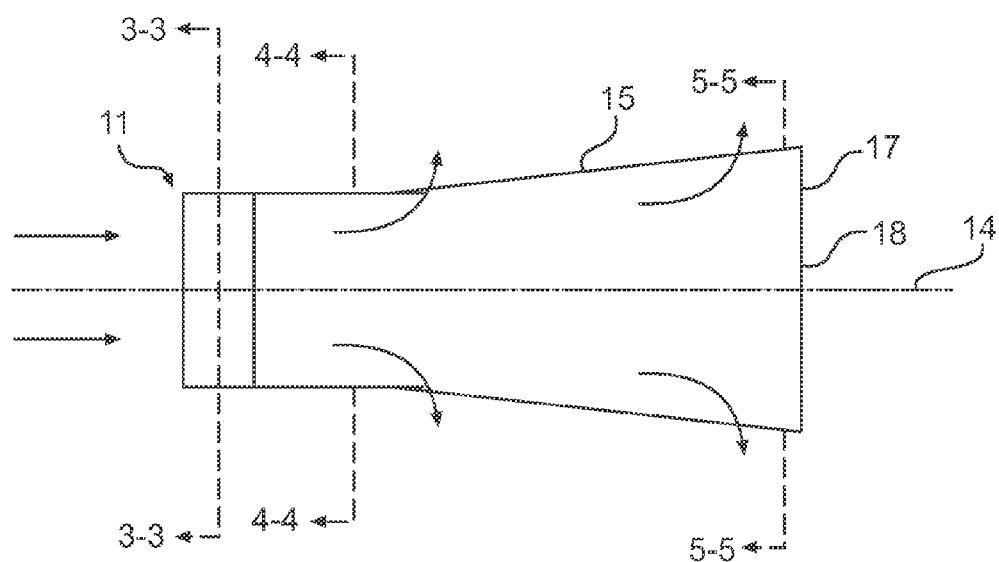
FIG. 2 is a schematic diagram illustrating the flow of exhaust gas within the pre-converter of FIG. 1.
Figure 3:
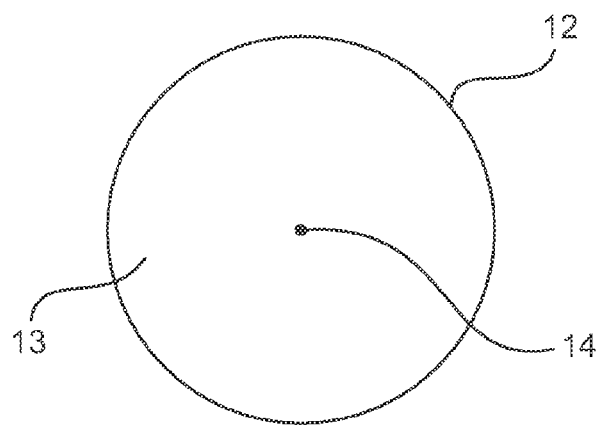
FIG. 3 is a schematic representation of the cross section of the pre-converter along section line 3-3 in FIG. 2.
Figure 6:
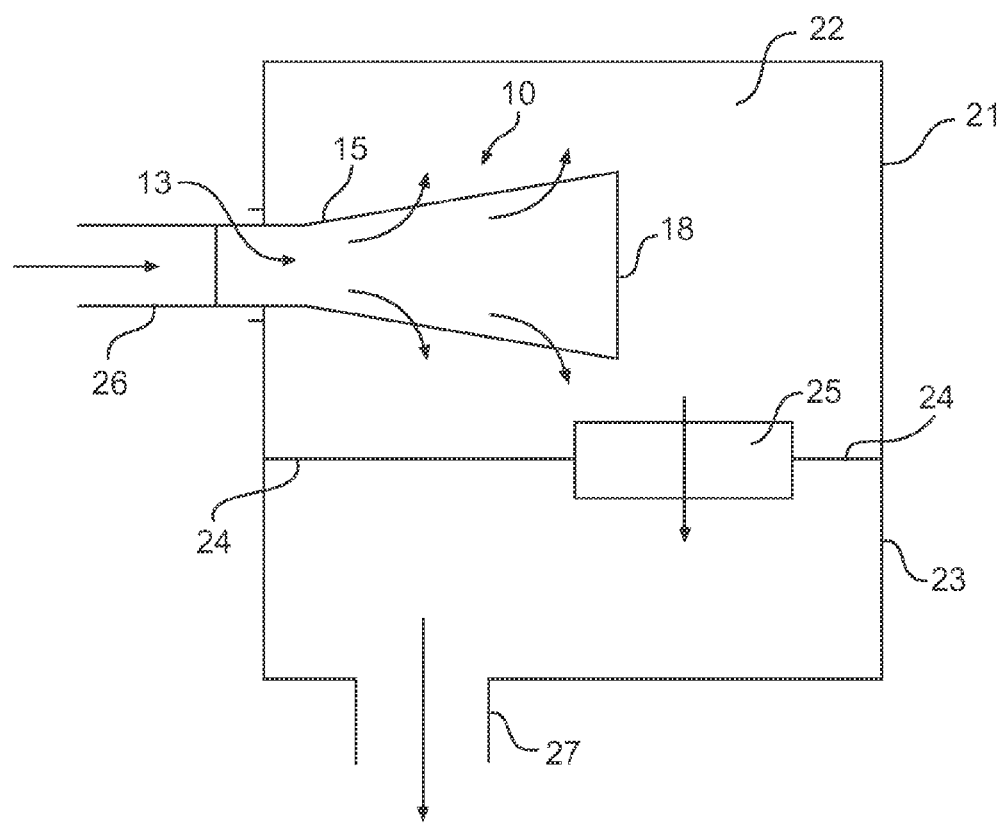
FIG. 6 is a schematic view of an exhaust system employing a pre-converter in accordance with an embodiment of the present invention.

The pre-converter 10 has an elongated body, as shown in FIGS. 1, 2 and 6 having an inlet area 11 located on one end. Exhaust gases from the engine cylinders are introduced into the pre-converter 10 through the inlet area 11. The inlet area 11 preferably has a solid wall 12 such that is can be connected to the exhaust system 20 to prevent leakage of exhaust gas. The inlet area 11 is formed from metal, which can be a high alloy steel. As shown in FIG. 3, the inlet area 11 has a generally circular cross section having a central passageway 13 extending there through substantially parallel to the longitudinal axis 14.

Extending from an opposite end of the inlet area 11 is a perforated exhaust sleeve 15. The central passageway 13 extends through the sleeve 15, as shown in FIGS. 1, 2, and 4-6. The sleeve 15 preferably has a plurality of openings 16 formed therein which substantially cover the sleeve 15, as shown in FIG. 1. The openings 16 permit the exhaust gases to flow there through. The wall forming the sleeve 15 and the openings 16 together form the active surface 17 of the pre-converter 10. The conversion of the unburned hydrocarbons and the pollutants occurs on the active surface 17. To take into account the expansion of the exhaust gas due to a rise in temperature associated with the cleansing process, the amount of active surface 17 available to react with the unburned hydrocarbons and pollutants increases as the distance from the inlet area 11 increases (i.e., in the direction of flow of the exhaust gases along axis 14). The perforated sleeve 15 is preferably formed from metal. The sleeve 15 can be formed from perforated sheet metal. The sleeve 15 can also be formed from a woven metal material, wherein the openings 16 are formed by the spaces between the metal threads, which form the material. The perforated sleeve 15 is coated with a catalyst material. The downstream end of the perforated sleeve 15 can be closed off by a suitable plate or cover 18, as shown in FIGS. 2 and 6. The provision of the cover 18 causes the exhaust gases to exit the perforated sleeve 15 through the openings 16. The cover 18, however, can be omitted, which would result in a decrease in the overall performance of the pre-converter 10.

During operation, the exhaust gas is fed into the pre-converter 10 through the inlet area 11 whereby it is fed through the central passageway 13 into the sleeve 15. The gas exits the sleeve 15 through the plurality of openings 16. The flow of exhaust gas is illustrated by arrows in FIGS. 2 and 6. Once in the sleeve 15, the exhaust gas and more particularly the unburned hydrocarbons and/or other pollutants in the exhaust gas come into contact with the catalytic material coating the surfaces of the sleeve 15. The hydrocarbons and pollutants undergo catalytic conversion and the exhaust gas is cleaned. The exhaust gas is then fed to the primary or main converter for further cleansing.

The pre-converter 10 is preferably included as part of an exhaust system for an internal combustion engine. One possible exhaust system 20 is illustrated in FIG. 6. The exhaust system 20 includes a muffler 21. The muffler 21 can include a plurality of muffler chambers 22 and 23 that are separated by at least one partition 24. A primary or main catalytic converter 25 is located within the muffler 21. The converter 25 can be a conventional converter such as, for example, a converter having a honeycomb construction. The converter 25 can be located in one of the muffler chambers 22 and 23. The converter 25 can also be located in the area between the chambers 22 and 23 in an opening formed in one of the partitions 24, as shown in FIG. 6. The exhaust gas enters the muffler 21 through a suitable supply pipe 26, which is connected to the inlet area 11 of the pre-converter 10. The exhaust gas passes through pre-converter 10 along the central passageway 13. The exhaust gas passes through the openings 16 in the sleeve 15 into the first chamber 22. The exhaust gas then travels through the primary converter 25 into the second chamber 23. The treated exhaust gas then exits the muffler 21 through an opening 27. Arranging the pre-converter 10 within the muffler 21 makes it possible to design an exhaust system with a simple design that also saves space. Locating the pre-converter 10 in the rear end of the muffler can reduce the temperature load in the area of the exhaust turbine or the front muffler.

The pre-converter 10 and in particular, the shape of the perforated sleeve 15 will now be described in greater detail. The temperature of the exhaust gas within the pre-converter 10 increases within the pre-converter 10 in response to the exhaust gas and in particular the unburned hydrocarbons and pollutants reacting with the catalytic material on the active surface 17 (i.e., the temperature of the gas increases as the distance from the inlet area 11 increases). Given this phenomena, it is desirable to provide sufficient space within the pre-converter 10 to let the exhaust gas expand and penetrate the catalytic material on the active surface 17. This can be accomplished by providing the perforated sleeve 15 with a generally conical shape that increases as the distance from the inlet area 11 increases, as shown in FIGS. 1, 2 and 6. This arrangement provides particularly good wetting of the active surface 17 of the pre-converter 10. Although the specific surface area through which the exhaust gases pass on their way through the pre-converter 10 increases, there is only a slight increase in the cross-sectional area of the pre-converter 10, as shown in FIGS. 1 and 2. Because of the greater exposure to the active surface 17 associated with the provision of depression(s) 19, the conversion of the unburned hydrocarbons on the catalytic surface takes place much more rapidly and/or more pollutants are removed from the gas in a given time.

Figure 4:
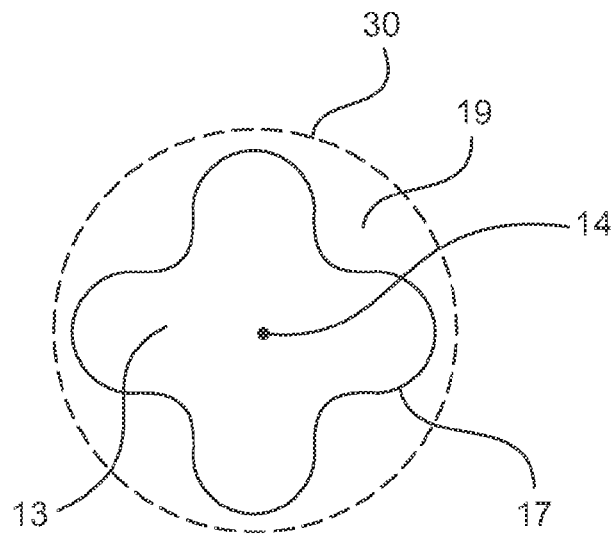
FIG. 4 is a schematic representation of the cross section of the pre-converter along section line 3-3 in FIG. 2.
Figure 5:
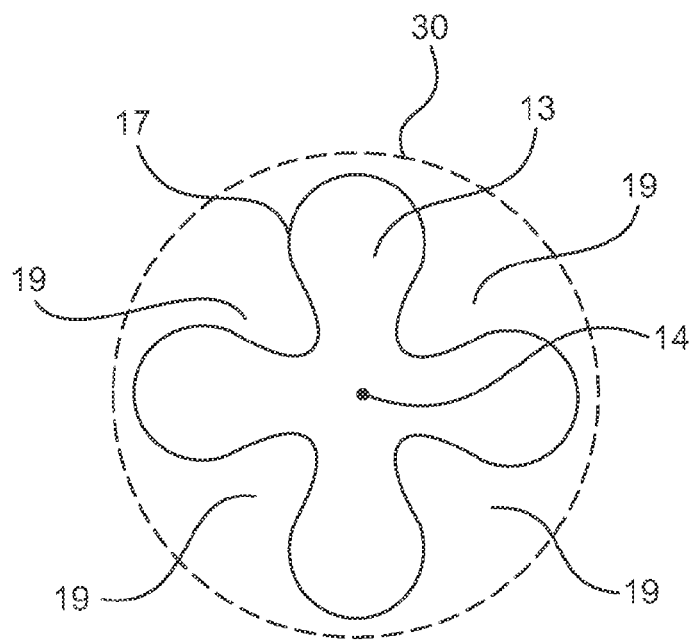
FIG. 5 is a schematic representation of the cross section of the pre-converter along section line 3-3 in FIG. 2.

The perforated sleeve 15 includes at least one depression or indentation 19. The depth of the depression 19 can increase as the distance from the inlet area 11 increases. The provision of the depression(s) 19 increases the specific surface area of the active surface 17 of the pre-converter 10. As shown in FIG. 3, the central passageway 13 through which the exhaust gas flows has a generally circular cross-section in the inlet area 11. As the distance from the inlet area 11 increases, the geometry of the central passageway 13 changes, as shown in FIGS. 4 and 5. The depth of the depression(s) 19 also increases. Absent depression(s) 19, the perforated sleeve 15 has an outer periphery 30, which increases along the axis 14 in the direction of flow, as shown in FIGS. 4 and 5. The cross-section of the perforated sleeve 15 containing depression(s) 19 is significantly smaller than the outer periphery 30. As such, the central passageway 13 has a comparatively smaller cross-sectional area. With this arrangement, the exhaust gas, which is heated and thus expands as a result of thermal conversion of the active surface 17 of the pre-converter 10 is forced through the perforated outer surface of the sleeve 15. This results in a more rapid and efficient conversion of the unburned hydrocarbons and pollutants on the active surface 17 of the pre-converter 10.

The at least one depression 19 is oriented essentially along the axis 14. This arrangement of depressions ensures that as the specific surface grows larger, the internal cross section area of the pre-converter, which is to say the surface that is defined by the perforated outer casing of the pre-converter, grows smaller. The depressions 19 can be formed by compressing the sleeve 15 at desired locations. Thus, it is possible to achieve a sleeve 15 having a particularly stable shape that can withstand the temperature-induced expansion of the exhaust gases. In accordance with embodiments of the present invention, one or more depressions 19 can be provided in the sleeve 15. The depressions 19 extend in a direction substantially parallel to the axis 14. When a plurality of depressions 19 are incorporated, the depressions 19 can being arranged at regular or irregular intervals around the sleeve 15. As discussed above, the depth of the depressions 19 increases along the axis 14. When a single depression 19 is provided, its depth and width may be greater than the depth and width of the depression when a plurality are present in order to provide the desired increase in area of the active surface 17.

As shown in FIGS. 3 and 4, the shape and size of the depressions 19 change as the sleeve 15 extends away from the inlet 11. Accordingly, as shown in FIGS. 1-4, a cross-sectional shape of the sleeve 15 also varies from a rounded shape at the inlet 11 to a clover-leaf like or bulbous shape at the downstream end of the sleeve 15.

As illustrated in FIGS. 4 and 5, at intermediate and downstream portions of the sleeve 15, the active surface 17 has a perimeter in a plane that is perpendicular to the longitudinal axis 14. An internal cross-sectional area of the sleeve 15 is smaller than an area of a circle 30 having an equally long perimeter (i.e., the cross-section of the sleeve 15 is non-circular). The internal cross-sectional area of the sleeve 15 at the intermediate and downstream portions of the sleeve is preferably at least about 5% smaller than the area of the circle 30, is more preferably at least about 10% smaller than the area of the circle 30, is even more preferably at least about 20% smaller than the area of the circle 30, is even more preferably at least about 30% smaller than the area of the circle 30, and is even more preferably at least about 50% smaller than the area of the circle 30. The circle 30 has a diameter that is larger than a width of the sleeve 15.

The foregoing illustrated embodiments are provided to illustrate the structural and functional principles of the present invention and are not intended to be limiting. Numerous variations and modifications are considered to be well within the scope of the present invention. While the pre-converter 10 has been described for use in the muffler 20, it is contemplated that the pre-converter 10 can be placed in variation locations within the exhaust system provided the pre-converter 10 is positioned upstream from the main or primary converter. Variations in the shape of the pre-converter 10 are contemplated provided the surface area of the active surface 17 increases as the distance from the inlet area 11 increases. It is further contemplated that the pre-converter 10 described herein can be used as a primary or main catalytic converter device. The principles of the present invention are intended to encompass any and all changes, alterations and/or substitutions within the spirit and scope of the following claims.

What is claimed is:

1. A catalytic converter device for cleansing exhaust gas emitted from an internal combustion engine, the catalytic converter device comprising:
   an elongated body having a longitudinal axis;
   an inlet portion located at one end of the elongated body for receiving the exhaust gas;
   a sleeve extending generally away from the inlet portion generally along the longitudinal axis;
   at least one depression formed in the sleeve, the depression having a depth, the depth of the depression increasing with increasing distance from the inlet portion; and
   a catalytic material disposed on the sleeve to form an active surface for reacting with the exhaust gas,
   a perimeter defined by the active surface in a plane perpendicular to the longitudinal axis, the perimeter increasing with increasing distance from the inlet portion, and
   a cross-sectional area defined by the active surface in a plane perpendicular to the longitudinal axis, the cross-sectional area decreasing with increasing distance from the inlet portion.

2. The catalytic converter device according to claim 1, wherein the sleeve has a plurality of openings formed therein.

3. The catalytic converter device according to claim 2, wherein said plurality of openings extend across the active surface.

4. The catalytic converter device according to claim 2, wherein the sleeve has an opening formed in an end of the sleeve opposite the inlet portion, the catalytic converter device further comprising a cover plate covering the opening.

5. The catalytic converter device according to claim 1, wherein each of the at least one depression extends in a direction substantially parallel to the longitudinal axis.

6. The catalytic converter device according to claim 1, wherein the at least one depression is a plurality of depressions arranged at regular intervals around the sleeve.

7. The catalytic converter device according to claim 1, wherein at an end of the sleeve opposite the inlet portion:
   the cross-sectional area of the sleeve is at least about 5% smaller than an area of a circle having an equally long perimeter, and the circle has a diameter that is larger than a width of the sleeve.

8. An exhaust system for an internal combustion engine, comprising:
   an exhaust inlet defining an upstream end of the exhaust system;
   an exhaust outlet defining a downstream end of the exhaust system;
   the exhaust inlet and the exhaust outlet defining a flow path therebetween;
   a primary catalytic converter device disposed along the flow path; and
   a preliminary catalytic converter device disposed along the flow path in an upstream direction from the primary catalytic converter device,
   the preliminary catalytic converter device comprising:
      an elongated body having a longitudinal axis;
      an inlet area located at one end of the elongated body for receiving the exhaust gas;
      a sleeve extending generally away from the inlet area generally along the longitudinal axis;
      at least one depression formed in the sleeve, the depression having a depth, the depth of the depression increasing with increasing distance from the inlet area; and
      a catalytic material disposed on the sleeve to form an active surface for reacting with the exhaust gas, a perimeter defined by the active surface in a plane perpendicular to the longitudinal axis, the perimeter increasing with increasing distance from the inlet area, and
   the cross-sectional area of the active surface in a plane perpendicular to the longitudinal axis decreasing with increasing distance from the inlet area.

9. The exhaust system according to claim 8, further comprising a muffler, the preliminary catalytic converter device being arranged at least partially within the muffler.

10. The exhaust system according to claim 8, wherein the sleeve has a plurality of openings formed therein.

11. The exhaust system device according to claim 10, wherein said plurality of openings extend across the active surface.

12. The exhaust system according to claim 8, wherein each of the at least one depression extends in a direction substantially parallel to the longitudinal axis.

13. The exhaust system according to claim 8, wherein the at least one depression is a plurality of depressions arranged at regular intervals around the sleeve.

14. The exhaust system according to claim 8, wherein the sleeve has an opening formed in an end of the sleeve opposite the inlet portion, the catalytic converter device further comprising a cover plate covering the opening.

15. The catalytic converter device according to claim 8, wherein at an end of the sleeve opposite the inlet portion:
   the cross-sectional area of the sleeve is at least about 5% smaller than an area of a circle having an equally long perimeter, and the circle has a diameter that is larger than a width of the sleeve.

* * * * *

UNITED STATES PATENT AND TRADEMARK OFFICE
CERTIFICATE OF CORRECTION

PATENT NO. : 7,384,609 B2  
APPLICATION NO. : 10/766469  
DATED : June 10, 2008  
INVENTOR(S) : Gunther Zauner Page 1 of 1

It is certified that error appears in the above-identified patent and that said Letters Patent is hereby corrected as shown below:

Front page, (75) Inventor:

Replace "Gunter Zauner" with -- Gunther Zauner --

Signed and Sealed this

Twenty-sixth Day of August, 2008

JON W. DUDAS  
*Director of the United States Patent and Trademark Office*